US012708965B2

(12) United States Patent
Berger et al.

(10) Patent No.: US 12,708,965 B2
(45) Date of Patent: Aug. 18, 2026

(54) CONTROL OF A LASER CUTTING MACHINE BY MEANS OF AIRBORNE SOUND SIGNALS

(71) Applicant: BYSTRONIC LASER AG, Niederönz (CH)

(72) Inventors: Michael Berger, Bern (CH); Andreas Luedi, Burgdorf (CH); Roland Bader, Ruetschelen (CH)

(73) Assignee: BYSTRONIC LASER AG, Niederönz (CH)

( * ) Notice: Subject to any disclaimer, the term of this patent is extended or adjusted under 35 U.S.C. 154(b) by 0 days.

(21) Appl. No.: 18/874,186

(22) PCT Filed: Oct. 18, 2023

(86) PCT No.: PCT/EP2023/078971
§ 371 (c)(1),
(2) Date: Dec. 12, 2024

(87) PCT Pub. No.: WO2024/104690
PCT Pub. Date: May 23, 2024

(65) Prior Publication Data
US 2025/0162083 A1 May 22, 2025

(30) Foreign Application Priority Data
Nov. 14, 2022 (EP) .................................... 22207209

(51) Int. Cl.
*B23K 31/10* (2006.01)
*B23K 26/03* (2006.01)
(Continued)

(52) U.S. Cl.
CPC .............. *B23K 31/10* (2013.01); *B23K 26/03* (2013.01); *B23K 26/0869* (2013.01);
(Continued)

(58) Field of Classification Search
CPC .... B23K 31/10; B23K 26/03; B23K 26/0869; B23K 26/1462; B23K 26/38; B23K 26/702; B23K 31/125; B23K 37/0408
See application file for complete search history.

(56) References Cited

U.S. PATENT DOCUMENTS 11,478,876 B2 * 10/2022 Izumi .................. B23K 26/083
2011/0278277 A1 11/2011 Stork Genannt Wersborg
(Continued)

FOREIGN PATENT DOCUMENTS

DE 102009050784 B4 2/2012
DE 102017208630 A1 * 11/2018 ............. B23K 26/70
(Continued)

OTHER PUBLICATIONS

DE 102017208630 A1—Translation (Year: 2025).*
(Continued)

*Primary Examiner* — Steven W Crabb
*Assistant Examiner* — Keith Brian Assante
(74) *Attorney, Agent, or Firm* — Workman Nydegger

(57) ABSTRACT

The present disclosure relates to a method for providing a quality assessment result and a laser cutting machine for cutting workpieces at a processing point. The laser cutting machine is designed as having: a laser cutting head which is mounted so as to be movable at least in an X-direction and defines a beam propagation direction of a laser beam; a storage device for storing the workpiece to be cut; a machine frame with at least one frame part; at least one airborne sound sensor, which can be moved in the X-direction relative to the frame part, wherein the at least one airborne sound sensor is arranged in the beam propagation direction after, in particular below, the processing point and oriented towards the latter.

11 Claims, 7 Drawing Sheets

(51) Int. Cl.

| | |
|---|---|
| ***B23K 26/08*** | (2014.01) |
| ***B23K 26/14*** | (2014.01) |
| ***B23K 26/38*** | (2014.01) |
| ***B23K 26/70*** | (2014.01) |
| ***B23K 31/12*** | (2006.01) |
| ***B23K 37/04*** | (2006.01) |

(52) U.S. Cl.
CPC .......... *B23K 26/1462* (2015.10); *B23K 26/38* (2013.01); *B23K 26/702* (2015.10); *B23K 31/125* (2013.01); *B23K 37/0408* (2013.01)

(56) References Cited

U.S. PATENT DOCUMENTS

| | | | | |
|---|---|---|---|---|
| 2018/0147658 | A1* | 5/2018 | Shapiro | B23K 26/0853 |
| 2018/0147665 | A1* | 5/2018 | Furuya | B23K 26/032 |
| 2019/0232434 | A1 | 8/2019 | Magg et al. | |
| 2020/0061746 | A1* | 2/2020 | Izumi | B23K 26/046 |
| 2022/0032397 | A1* | 2/2022 | Ivkovich | G06N 3/08 |
| 2022/0274202 | A1* | 9/2022 | Wilson | B23K 9/1093 |
| 2023/0056400 | A1* | 2/2023 | Chakraborty | B23K 9/125 |
| 2024/0269779 | A1* | 8/2024 | Yamaguchi | B23K 26/08 |

FOREIGN PATENT DOCUMENTS

| | | | |
|---|---|---|---|
| EP | 0129952 | A1 | 1/1985 |
| JP | 2000210768 | A | 8/2000 |
| JP | 2014113597 | A | 6/2014 |
| WO | 2010057661 | A1 | 5/2010 |
| WO | 2018069308 | A1 | 4/2018 |

OTHER PUBLICATIONS

International Search Report and Written Opinion, mailed Jan. 30, 2024, for PCT App. No. PCT/EP2023/078971, 12 pages.

International Preliminary Report on Patentability, mailed Aug. 12, 2024, for PCT App. No. PCT/EP2023/078971, 22 pages.

Lee et al., "Efficient sparse coding algorithms", Neural Information Processing Systems, Dec. 4, 2006, https://proceedings.neurips.cc/paper_files/paper/2006/file/2d71b2ae158c7c5912cc0bbde2bb9d95-Paper.pdf.

* cited by examiner

CONTROL OF A LASER CUTTING MACHINE BY MEANS OF AIRBORNE SOUND SIGNALS

BACKGROUND

1. Background and Relevant Art

The invention relates to the field of laser cutting technology and in particular to a laser cutting machine, a method for detecting airborne sound signals from a laser cutting machine, a digital processing unit, a laser cutting system and a computer program.

When processing workpieces, in particular flat or tubular workpieces, e.g. made of metal, a large number of adjustments must be done on the laser cutting machine in order to achieve the desired quality. It may also be necessary to change these settings dynamically during the cutting process in order to meet the required quality of the cutting result in all positions. The settings can relate, e.g. to a focus position and/or a feed rate and/or a laser power and/or a nozzle spacing and/or a process gas pressure and/or a laser beam magnification relative to the workpiece.

The quality (cutting quality) can be processed as a quality status and/or can be multi-dimensional. The quality status can include different quality parameters, such as scoring (the cut surfaces should be as flat as possible without scoring), burr formation, cutting gap width, brow, slag adhesion, squareness and/or other quality features.

It is known in the prior art to detect optical sensor signals, for example from a camera which is aimed at the process zone, and to process them in order to assess the quality. The camera is preferably arranged on the cutting head and is oriented towards the process zone from above. WO2018069308A1 shows the observation of the cutting gap width, showing that the focus position of the working laser can be determined by means of cutting gap width recognition. DE102009050784B4 shows the use of camera and lighting, wherein images are recorded with different lighting conditions, which are evaluated together to assess process features.

However, the detection and/or assessment of quality based solely on optical signals is limited.

Furthermore, US2020061746 AA is known, in which a sensor is presented in order to measure the process gas flow on the one hand and the sound of the process gas flow impact from above (above the workpiece) on the other hand. Here, too, industrial implementation may be demanding. In addition, the approach seems unsuitable for estimating cutting quality.

The present invention is therefore based on the object of providing an improved laser cutting machine, which in particular has improved cutting quality detection, and an improved method for detecting airborne sound, in particular for cutting quality estimation, as well as a digital processing unit, a laser cutting system and a computer program.

This object is achieved by the accompanying mutually independent patent claims, in particular by a laser cutting machine, a method for detecting airborne sound that can be used to provide a quality estimation result for a laser cutting process of a laser cutting machine, a digital processing unit, a laser cutting system and a computer program.

The invention is described below, first with reference to the device claim. Features, advantages, or alternative embodiments mentioned in this way can also be applied to the other claimed subjects, and vice versa. In other words, the present claims (which are directed, for example, to a laser cutting device, a system or to a computer program product) can also be further developed with the features described and/or claimed in connection with the method, and vice versa. The corresponding functional features of the method are thereby formed by corresponding present modules, in particular by hardware modules or microprocessor modules, of the system or of the product, and vice versa. The preferred embodiments of the invention described in connection with the method are not repeated explicitly for the device, but can be transferred or applied to it, and vice versa.

According to a first aspect, the invention relates to a laser cutting machine for cutting workpieces at a processing point, with

- a laser cutting head, which is mounted so to be movable at least in an X-direction and defines a beam propagation direction of a laser beam;
- a storage device for storing the workpiece to be cut;
- a machine frame with at least one frame part;
- at least one airborne sound sensor, which can be moved in the X-direction relative to the frame part, wherein the at least one airborne sound sensor is arranged in the beam propagation direction after, in particular below, the processing point and oriented towards it.

The at least one airborne sound sensor is used to detect airborne sound that is to be evaluated according to the invention. Airborne sound (in contrast to welding, hardening, laser sintering, etc.) has so far been difficult to use in laser cutting, because large streams of process gas are used in laser cutting, which drive the molten metal out of the kerf. This strong gas jet causes the sound, which can contain important information about the cutting process for quality evaluation, to be blown/carried under the sheet metal (or workpiece) and propagated there. When detecting sound signals, in particular airborne sound signals, the interpretation and purposeful evaluation of the detected signals is of great importance. This could not be sufficiently achieved in the prior art. In addition, the space under the sheet metal is difficult to access.

BRIEF SUMMARY

The idea according to the invention is now to arrange one or more airborne sound sensors, preferably one or more microphones, in particular directional microphones, at the edge of the processing area on a moving cutting bridge (also simply called a bridge) below the workpiece, so that the at least one microphone/directional microphone travels along with the bridge during the cutting process. In this way, the sound in the space below the processing point or in the propagation direction of the gas jet after the processing point can be detected in a surprisingly simple manner. Furthermore, the cutting quality can be estimated from a detected sonogram. The at least one airborne sound sensor can preferably be arranged below a support plane, viewed in the beam propagation direction.

One of the many advantages of this is a slim design of the airborne sound sensors, which requires little or no modification to the previous machines and still delivers highly efficient and reliable measurement results.

The laser cutting machine is used for material processing and in particular for cutting metal workpieces, in particular sheet metal or metal pipes, in the high-power range of over 1 kW, in particular over 12 KW and more preferably over 20 kW.

The laser cutting machine comprises a laser beam source, a laser beam guide and a processing head (cutting head, focusing optics) including a cutting nozzle. The beam leaving the laser beam source can be guided in the near-infrared range (Nd: YAG laser, fibre laser, disk laser, diode direct laser) via fibre optic cables, in the case of a CO2 laser via deflection mirrors to the focusing optics and via these to the processing point. The focusing optics concentrates the laser beam into a focus and thus generates the intensity required for cutting.

The processing point identifies a position on or in the workpiece. The processing point is preferably in a plane of the workpiece. The processing point may more or less coincide with the focus point. As a rule, there is no exact match, since the focus can be slightly above, inside or below the workpiece. The processing point can be arranged on the surface of the workpiece (e.g. in the case of engraving, where no cutting through takes place). The processing point can be in the propagation direction of the laser beam (Z-direction) above or in a support plane of the workpiece. The workpiece can be stored on a storage device.

The workpiece can be a flat workpiece that is intended for cutting with the laser cutting machine, in particular in the form of a flat-bed machine. Alternatively or cumulatively, the workpiece can also be a three-dimensional object, for example a solid profile, a tube or a hollow profile, which is intended in particular for cutting with a pipe cutting machine. The pipe can have an angular and/or a round cross-sectional profile. The workpiece can in particular be made of metal, for example a metal sheet or metal profile.

The machine frame is used for the laterally movable mounting of the storage device. The machine frame can be designed as a frame or have a frame-like structure. The storage device can be designed, for example, in the form of a shuttle table. The shuttle table is displaceably mounted—preferably with linear drives—along a plane parallel to the support plane of the workpiece and can move in and out of the machine frame. The machine frame comprises at least one frame part. The machine frame, and in particular its frame part, can carry a bridge on which a laser cutting head is movably mounted. The bridge is movably mounted on the frame part by means of at least one bridge foot and is guided in particular on guide rails running in an X-direction on the frame part. The laser cutting head can preferably be moved in a Y-direction on or along the bridge.

Alternatively or in addition to the bridge, a robot arm can be provided, on which the laser cutting head is arranged and via which it can be moved.

The storage device is used to store the workpiece at least during and after the cutting process. The storage device can be designed, for example, as a grid-like storage device or can comprise a grid (comprising a plurality of grid elements) and be used to store a flat workpiece. The grating elements of the storage device can be configured essentially parallel. The grid elements of the storage device can also be corrugated (e.g. corrugated in the longitudinal axis of the grid element and/or forming a depression/elevation). The storage device is used for the temporary storage and/or transport of the workpiece for the purpose of cutting.

The storage device can also be used as a mandrel, in particular a clamping mandrel, and are used to hold pipes and/or hollow profiles for the purpose of laser cutting and/or during laser cutting.

The at least one airborne sound sensor, preferably at least two airborne sound sensors, particularly preferably four airborne sound sensors, can be arranged below the processing point in the beam propagation direction and oriented towards it. One airborne sound sensor can be sufficient, in particular for pipe processing, while one airborne sound sensor can be used when processing flat workpieces, but at least two airborne sound sensors are preferred.

The at least one airborne sound sensor can be arranged at least indirectly on a bridge foot, so that, when the bridge is moved with the laser cutting head, the at least one airborne sound sensor is moved in the X-direction along with the laser cutting head guided on the bridge.

The at least one airborne sound sensor serves—as the name already suggests—to detect airborne sound and in particular not structure-borne sound. It can be designed as a directional microphone.

The airborne sound sensor is preferably configured in such a way that it converts the detected sound (analogue signal) into a digital signal (by means of an AD converter). This makes it possible to further process the detected sound signals (raw signal) digitally in a digital data processing unit. The airborne sound sensor can have an analogue input and a digital output as an interface. Alternatively or cumulatively, the analogue detected sound signals can be converted into electrical signals.

Alternatively or cumulatively, the airborne sound sensor can include a frequency determining device that is intended to determine a frequency characteristic of the sound.

In a preferred embodiment of the invention, provision is made for the airborne sound emissions to be detected in a frequency range between 10 Hz and 2 MHz.

The detection of the upper frequency range is particularly preferred, in particular above 150 kHz, particularly preferably in a range between 150 KHz and 700 KHz. In this frequency range, the useful acoustic signal is particularly interesting for the following reason. Background noise is to be expected in a laser cutting machine, for example due to smoke extraction, lateral blowing devices, etc. The background noise can mask or disturb the useful signal. It is known from the literature that disturbing background noise mostly dominates in the low frequency range, in particular for example below 150 kHz (cf. e.g. Acoustic Process Control for Laser Material Processing (xarion.com)).

The at least one airborne sound sensor, in particular the at least one directional microphone, can be rotatably and pivotably mounted, in particular in order to track the movement of the laser cutting head during cutting according to a cutting plan and/or to remain oriented towards the processing point even when the laser cutting head is moving. The pivot axis (the axis about which the airborne sound sensor can be pivoted) of the airborne sound sensor can in particular be configured parallel to the X-direction (the direction in which the bridge moves on the frame part), so that the at least one airborne sound sensor is more or less upwards or further oriented downwards with respect to a spatial coordinate system, or at least pivoted in a plane parallel to the Y-Z plane (see above). The pivot axis can also be parallel to a Z-direction, so that the airborne sound sensor can more or less be oriented further forwards or backwards in relation to the travel direction of the bridge. The Z-direction is perpendicular to the X- and Y-directions. In particular, the Z-direction can run in a propagation direction of the laser beam (beam propagation direction) or parallel thereto.

The at least one airborne sound sensor can have a detection axis that characterises the direction in which the sound signals are primarily detected. The detection axis essentially corresponds to an axis between the sound source and the airborne sound sensor. The detection axis of the airborne sound sensor can be oriented towards the processing point. The detection axis can be pivoted at least around the X-axis in order to enable precise orientation towards the processing point. The airborne sound sensor can be pivoted during a movement of the laser cutting head and/or in addition to the movement of the bridge feet along the X-axis.

Alternatively or cumulatively, the orientation/tracking (in particular the pivoting) of the at least one airborne sound sensor can be controlled automatically using the cutting plan, so that there is always an exact orientation to the current position of the processing point in the X-Y plane. The airborne sound sensor can thus be pivoted in the X/Y plane or in a plane parallel thereto. The pivoting angle can also be determined as a function of the position of the processing point in the X-Y plane spanned by the X- and Y-directions. This can preferably be carried out automatically by means of a tracking algorithm according to the cutting plan.

Alternatively or cumulatively, the airborne sound sensor can be rotated about an axis of rotation, wherein the axis of rotation extends in the X-direction or parallel thereto. The pivoting and/or rotating movements mentioned above can also be combined.

The airborne sound sensor can consist of a single sensor element. Alternatively, the airborne sound sensor can comprise a large number of sensor elements which are arranged at different positions in the airborne sound sensor, e.g. rotationally symmetrically, so that the airborne sound sensor can be rotated by means of a rotary drum according to a turret principle in the case that one sensor element fails, so that the next faultlessly functioning sensor element assumes its function. The rotation takes place in particular around the detection axis of the airborne sound sensor. It is therefore not necessary to replace the entire airborne sound sensor if one sensor element is defective.

If it is a flat-bed cutting machine for flat workpieces, the storage device can be designed as a table, in particular a movable shuttle table, as already explained above. In this case, the at least one airborne sound sensor is arranged below the support plane defined by the storage device (e.g. shuttle table) or arranged in the beam propagation direction of the laser beam after or below the processing point (intersection between laser beam and workpiece). The at least one airborne sound sensor can be oriented towards an axis that runs in the beam propagation direction and leads through the processing point.

In the case of a laser pipe cutting machine for tubular workpieces, the storage device can be designed with at least one, preferably two, lateral holders which take on the function of a chuck and are used to hold the tubular workpiece (e.g. as a mandrel). In this case, the at least one airborne sound sensor is also arranged below (seen in the direction of beam propagation) or inside the tubular workpiece (that is, seen in the direction of beam propagation: below an intersection between the laser beam and the workpiece). This plane can be parallel to the horizontal (e.g., when the tube is clamped parallel to the horizontal) or rotated through a pivot angle (e.g., when the laser beam impinges on the tube at an oblique angle to the horizontal). The at least one airborne sound sensor can be oriented towards an axis that runs in the beam propagation direction and leads through the processing point.

The X-direction (corresponding to an X-axis except for a sign) is transverse to the axis of the beam propagation direction. In particular, the X-direction can run at a right angle to the axis of the beam propagation direction. If, for example, a swivel head is used for phase cuts, the X-direction can also deviate from 90°. The X-direction runs in or parallel to the longitudinal axis of the shuttle table or the storage device. The Y-direction (corresponding to a Y-axis except for a sign) is transverse to and specifically at right angles to the X-axis. The Y-direction can indicate the direction in which the cutting head is translated on a bridge. The Z-direction can run parallel to the beam propagation direction of the laser beam and, in particular in the case of a flat-bed laser cutting machine, perpendicular to a plane spanned by the X-direction and the Y-direction.

Alternatively or additionally, the laser cutting machine can be designed with a bridge with two bridge feet arranged laterally on this bridge for guiding the bridge on the machine frame in the X-direction perpendicular to the Y-direction.

The airborne sound sensor can be arranged and/or attached directly to the bridge foot, in particular below the support plane. Alternatively, it can be arranged and/or fastened to the bridge foot indirectly via a further component, for example on a holder or a carrier. The further component can in turn be arranged and/or fastened to the bridge foot, in particular detachably.

In a preferred embodiment of the invention, it can be provided that at least one airborne sound sensor is arranged on each of the two bridge feet, in particular below the support plane. This means that the sound can be detected from both sides (of the storage device). Furthermore, the signals from the airborne sound sensors (at least one or more) can be evaluated from the two opposite sides in connection with position information about the position of the laser cutting head, in particular in the Y-direction.

In a further preferred embodiment of the invention, the laser cutting machine can be designed with at least one holder for the at least one airborne sound sensor, which is arranged on the bridge foot or on each bridge foot, in particular below the support plane.

Alternatively or additionally, the at least one airborne sound sensor can be movably, in particular pivotably, arranged on the bridge foot, preferably movably on the holder on the bridge foot. In particular, the at least one airborne sound sensor can be pivoted in an angular range in a Y/Z plane or about the X-axis. This has the advantage that the airborne sound sensor can be better oriented to a position below the processing point. In particular, the airborne sound sensor can be tilted up or down (i.e. in a plane spanned by the Z-axis and the Y-axis) and thus better oriented towards the dynamically moving source of the airborne sound. Pivoting can be carried out in addition to or independently of the movement of the airborne sound sensors (e.g. by moving the bridge feet along the X-axis).

Alternatively or additionally, at least two airborne sound sensors can be arranged on each bridge foot, preferably on the holder on the bridge foot, preferably spaced apart from one another in the X-direction.

The at least two airborne sound sensors can be at a sensor distance from one another in relation to the X-direction which is smaller than the distance between two elements of the storage device for storing the workpiece to be processed. This has the advantage that at least two sound signals can be detected on one of the two sides of the storage device in an intermediate region between two storage device elements.

The above-mentioned elements of the storage device can be grid elements of a support element, in particular a support grid.

Alternatively or additionally, at least one fluid nozzle for generating a fluid curtain can be arranged in front of the airborne sound sensor or sensors on at least one holder.

The fluid nozzle can be a cleaning nozzle intended to remove dirt such as slag, chips and dust.

In a preferred embodiment of the invention, it is provided that the cleaning nozzles can optionally, typically alternately, be connected to the airborne sound sensor. This has the advantage that the gas jet from the cleaning nozzles does not disturb the airborne sound sensor. The quality of the estimation result can thus be improved.

Alternatively or additionally, a holder can be provided on each bridge foot, wherein at least one fluid nozzle is arranged on each holder.

Alternatively or additionally, an evaluation device for the sensor signals of the at least one airborne sound sensor can be provided, wherein the sensor signals in the evaluation device are corrected for the sound emissions of the at least one fluid nozzle. This makes the quality estimation more precise.

Alternatively or additionally, at least one suction opening for generating a fluid flow can be formed below the support plane.

Alternatively or additionally, the laser processing machine can have optical sensors in order to detect optical signals from a process zone of the laser processing of the workpiece, in particular cumulatively to the detected sound signals. The term "process zone" can refer to a space around the processing point that can be configured in terms of size.

Like the at least one airborne sound sensor, the optical sensors can be arranged below the support plane defined by the support element. Alternatively or additionally, the optical sensors can be arranged in a different position and in particular also above the support plane mentioned above, in particular on the laser cutting head and/or in a cutting cell. The cutting cell can be designed as a housing for a laser processing room.

The optical sensors can be designed as a camera, in particular as a CMOS or CCD camera, or as a number of cameras and/or as photodiodes.

Alternatively or additionally, as many optical sensors can be configured as airborne sound sensors are provided, so that the number of airborne sound sensors corresponds to the number of optical sensors. In addition, a different number of optical sensors can be configured compared to the number of airborne sound sensors.

The above-mentioned object is also achieved by a method for detecting airborne sound, wherein the airborne sound detected in this way can be used in particular for monitoring a laser cutting process of a laser cutting machine, as described above, with the following method step:

a) detecting sound signals with at least one airborne sound sensor during the laser processing of a workpiece, wherein the at least one airborne sound sensor is arranged in the beam propagation direction after, in particular below, the processing point and is oriented towards it; the at least one airborne sound sensor can be arranged either below a support plane defined by a storage device or below a processing point in the beam propagation direction; the at least one airborne sound sensor can be oriented towards the processing point or an axis that runs in the beam propagation direction.

The support plane is the plane in which a (flat) workpiece rests with its underside on the storage device (e.g. upper side of the grid elements of a shuttle table). The processing point can be above the support plane or in the support plane itself.

In a preferred development of the method, the method can be used to provide a quality estimation result. To this end, the method can include the following further steps:

b) reading in the detected, and in particular digitised, sound signals in a digital processing unit;

c) evaluating the read-in detected sound signals by means of a machine learning algorithm which is designed to estimate a cutting quality on the basis of the evaluated read-in detected sound signals and to provide an estimated cutting quality as a result. Optionally, the result can be output on an HMI (human machine interface). The HMI can be arranged on the laser cutting machine or separately, for example on a mobile device (e.g. digital end device).

The quality estimation result can be provided online, that is to say during cutting, so that the result can already be provided during the cutting process.

Provision can be made to check whether the result with the estimated cutting quality falls below a threshold that can be preconfigured via the HMI (corresponds to a quality specification). If this is the case, it can be provided that at least one of the following steps is carried out:

d) generating control signals for controlling or regulating the laser processing machine; and/or e) using the generated control signals in a control unit of the laser processing machine. The method can thus be used to continuously monitor a laser cutting machine and/or the laser cutting process.

In the simplest case, if the estimated cutting quality falls below the threshold (quality specification), automatic monitoring measures can be triggered, in particular for closely monitoring the process. For example, the time interval for evaluating the detected sound signals can be determined to be smaller. If the quality specifications are complied with (represented by the configurable threshold value), it can be provided that the time interval for the evaluation is chosen to be larger.

Alternatively or cumulatively, the quality estimation result can be used to control the future cutting process, for example by adjusting parameters or parameters relating to the cutting process (e.g. machine parameters) in order to achieve a better quality estimation result.

In an advantageous development of the invention, the machine learning algorithm can include a correction algorithm which is intended to also provide the parameters to be changed for the cutting process (e.g. focus position, feed rate, laser power, etc.) as a result, so that the laser cutting process is again able to comply with the required and configured quality specifications. The correction algorithm can also be designed as a machine learning algorithm. The correction algorithm is trained in a training phase in order to determine the cutting parameters to be changed for an estimated cutting quality (which in this case does not meet the quality specifications). The training can be carried out by assigning a label to insufficient cutting quality estimates, the label comprising the at least one parameter to be corrected and a correction value relating thereto.

The machine learning algorithm provides a result. In a first embodiment of the invention, the result comprises the estimated cutting quality; In a second embodiment of the invention, the result includes—possibly additionally—the parameters to be corrected and/or the correction values.

The at least one airborne sound sensor can be movably arranged on a bridge foot of a bridge. The at least one airborne sound sensor can be moved with the bridge in the X-direction along the storage device during the laser processing. In particular, the at least one airborne sound sensor can be driven along with the movement of the laser cutting head in a quasi-passive manner below the workpiece without its own drive.

The machine learning algorithm can be trained to assign a cutting quality to the sound signals, in particular to the digitised sound signals, in particular in the form of a quality status. If necessary, control signals can be generated in such a way that a quality status can be optimised in response to the detected sound signals.

The machine learning algorithm can be designed to evaluate the detected airborne sound sensor signals (spectrograms) and optionally optical signals in order to draw conclusions about the cutting quality using machine intelligence or an intelligent algorithm. Typically, an algorithm in the field of artificial intelligence or of machine learning is used.

In a preferred embodiment of the invention, an end-to-end algorithm is applied. Thus, a manual feature extraction step followed by a classifier is no longer required. An end-to-end algorithm enables the system to automatically learn internal representations of the necessary processing steps or network layers (for quality assessment or estimation based on sound signals), e.g. the detection of important cutting quality features, wherein the detected sound signals are used in addition to the associated quality features as a training signal. This has the advantage that no problem-specific knowledge has to flow into the model architecture, which enables comprehensive data-driven learning. The prerequisite for this is that sufficient data is available for the training. In addition, the data must be at least partially labelled, i.e. labels must be available for the raw data. In particular, quality features or a measure of the quality must be assigned to the sound signals. The training data can be provided by test cuts with a subsequent quality assessment (manual and/or algorithmic) and/or with parameters to be corrected for labelling the data.

After the training, a data structure is created in which the detected airborne sound signals, quality features (or quality parameters) and/or parameters to be corrected are assigned. The model (e.g. neural network) trained in this way can then be used for newly acquired airborne sound signals in order to estimate a quality feature and/or output parameters to be corrected. The parameters to be corrected are used on the laser cutting machine and are used to ensure that the quality specification can be met again.

In particular, provision can be made to produce a large number of different cuts with different qualities (regarding scores/roughness and burr), wherein the sound (and optionally the optical signals) are recorded. In a second step, the quality of the cut parts is measured, i.e. the burr and the roughness are measured with an accuracy of a few micrometers (μm). The measured quality serves as labelling for training the (possibly deep) neural network (D)NN.

So that the cutting quality can be estimated in real time during cutting, the model must initially be trained with a lot of data. To do this, many cutting contours or parts of different cutting quality are produced and all sensor data (airborne sensor data and optionally optic sensor data) is saved. The cutting quality features of the cutting contours are then determined in the form of a quality status. The features are preferably measured locally separated over the entire cutting contour with, for example, a surface measuring device. Alternatively, the cutting quality can also be assessed or labelled. Cutting quality criteria are primarily burr height, slag residue and/or cut edge roughness. It is also possible to use the 3D point clouds of the measured cut surfaces for the training instead of the quality features determined.

The neural network can be trained in the usual way with the recorded sound signals and the associated labels (cutting quality and/or parameters to be corrected), so that the trained neural network can estimate the cutting quality from the sound signals in the inference phase.

Deep neural networks, which are trained with at least one deep learning algorithm, are preferably used as models in the end-to-end approach.

After successful training, the algorithm will independently recognise the cutting quality and/or parameters to be corrected according to the trained criteria in the inference phase.

In the extension of the learning algorithms for network structures with very few or no intermediate layers (so-called flat networks), as with the single-layer perceptron, the deep learning methods enable stable learning success even with numerous intermediate layers. The many intermediate layers enable high-dimensional input data to be abstracted step by step, which is particularly suitable for audio signals, spectrograms, images and image sequences without the need to predefine the extraction of characteristic values (signal features). There is a multitude of network structures, of which convolutional neural networks (CNN) and residual neural networks (RNN) are preferably used for the task at hand with audio signals and optional camera images.

For time signals (e.g. sound signals over time), time relationships or temporal features can be learned. Gated recurrent unit (GRU) and long short-term memory (LSTM) networks are suitable for this. It is advantageous to use a combined network that combines the above network structures in different layers.

It should be noted that, in addition to the preferred deep learning intelligence, other algorithms can alternatively or additionally also be used, for example polynomial regression models.

An online learning method can be integrated as a further advantageous embodiment of the invention. To this end, the model trained according to the above methods is followed by an algorithm for adaptively setting certain model parameters. This can e.g. be implemented using a reinforcement learning algorithm and/or using a sparse coding algorithm (see, e.g. https://proceedings.neurips.cc/paper_files/paper/2006/file/2d71b2ae158c7c5912cc0bbde2bb9d95-Paper.pdf) . As a result, the estimation of the cutting quality can be adjusted in real time during the cutting or intermittently by means of feedback from the machine operator. Furthermore, it is possible to adjust the cutting parameters based on the estimated quality.

In this context, reinforcement learning is to be understood as a method of machine learning that tries to maximise a reward through independent actions within a system. It is not necessary for all data to be labelled.

The quality is estimated (in the inference phase, i.e. after successful training of the network) in real time. The term "real time" is to be understood in the sense of the DIN ISO/IEC2382 standard such that it refers to a period of time during ongoing processing by the laser. Real time does not only mean the narrow time frame of a few milliseconds that is required for rapid control of the cutting process, but can also refer to a period of time in seconds (e.g. in the range of 1-5 seconds, preferably 1 to 2 seconds). Real time means that the steps, in particular providing the result with the quality estimation, are carried out with a time delay (in comparison with the laser processing process) of no more than a few seconds so that, for example, suitable measures can be taken to influence the cutting process (regulation or control of the cutting process), in particular automatic cutting quality optimisation.

Alternatively or cumulatively, cutting process control can also be implemented in real time using the provided cutting quality estimation. The aim is that, in addition to the cutting quality, it is also estimated which at least one cutting parameter is not optimally set or could be set better (at least one parameter to be corrected or correction parameters is named), if the cutting quality deviates from the desired quality. It is also possible that several cutting parameters can be optimised in order to achieve better cutting quality. Depending on the misalignment of a specific cutting parameter, the signal pattern may look different. Due to the large number of signal values and the comprehensive information they contain about the quality status or cutting condition, it can be expected that such a control can be implemented. Accordingly, provision is made in the regulation for primarily adapting the presumed faulty cutting parameter.

The cutting quality is estimated from the sensor signals and compared to the target quality. The target quality can be defined by configuring a threshold value for the quality (threshold then specifies which target quality should at least be achieved). The target quality can be from a database, for example, or via the HMI and operator. If the cutting quality and the target quality deviate noticeably from one another or by more than a preconfigurable threshold value, a correction algorithm can be used to automatically calculate a cutting parameter correction and/or apply it to the cutting parameters. The application of the cutting parameter correction can be made depending on the detection of a verification signal in order to give the user a greater possibility of influencing the control.

The regulation strategies explained above are exemplary and not the only possible strategies. Simpler approaches can be based, for example, on trial and error, i.e. if quality deterioration is observed, the most important cutting parameters can be changed at random, with it being observed whether the quality improves at most.

Alternatively or additionally, as well as estimating a cutting quality, an estimation of a possible deviation from an ideal process state can be determined. The ideal process state can be predetermined. An ideal process state primarily means that 1) the energy balance is right (sufficient power is applied to melt the intended material), and that 2) the temperature of the melt is ideal (the higher, the thinner and therefore easier to expel as well as lower surface tension and thus less droplet and burr formation, but not too high that evaporation occurs) and that 3) the gas jet in the joint is as laminar as possible and detaches from the cutting front as late as possible. In order to detect the process status, it can be provided that at least the temperature of the melt is measured and processed.

In a preferred embodiment of the invention, the method can include a further step after the evaluation step (step c)), namely an output of the estimated cutting quality and/or the evaluated detected sound signals (raw signals or digitised or further processed signals).

The machine learning algorithm is preferably implemented in the digital processing unit, in particular its computing unit. The machine learning algorithm may have been trained on a different computing unit than that of the digital processing unit or on the latter.

In a first simple implementation, the control signals represent measures to improve the quality of the cutting process. The measures can in particular involve changes to the cutting parameters, such as a change in the focus position and/or the laser power and/or the feed rate and/or the nozzle spacing and/or the process gas pressure and/or laser beam magnification and/or BPP (beam parameters product). The nozzle and/or optics/optical protective glass can also be replaced if they are worn or dirty.

In a further advantageous embodiment, the result (with the estimated cutting quality) and/or the control signals calculated based thereon can be transmitted directly to a controller on the laser cutting machine for controlling and/or regulating the laser cutting process. This increases the degree of automation.

Alternatively or additionally, the control signals can also initiate an output of a message on an HMI (human machine interface). Alternatively or additionally, the control signals can also initiate the sending of a message to the machine operator, in particular sending via a mobile radio connection, such as a text message.

In principle, two or three different communication media or communication channels can be provided for signal and/or data transmission:

1. air for the airborne sound detected by means of the airborne sound sensors; and
2. a digital network interface for providing the input data for the neural network (airborne sound sensor data and optionally optical sensor data, especially in processed, digitised form) and optionally:
3. a radio connection, in particular mobile radio connection, for transmission of the result in the form of the estimated cutting quality and/or the control signals to an electronic, in particular mobile, end device.

Alternatively or additionally, control signals and/or the result can be forwarded to a controller of the laser cutting machine via a radio and/or data connection (e.g. also via the digital network interface).

Alternatively or additionally, it can be provided that a machine stop is triggered when certain conditions occur.

In a preferred embodiment of the invention, the method can include a further step after the evaluation step, namely an output of the estimated cutting quality and/or the evaluated detected sound signals and/or optionally the correction parameters. The output can take place by means of an output interface, e.g. a UI.

Provision can be made for the at least one airborne sound sensor and/or the at least one optical sensor to travel along with the laser processing process in the beam direction after the processing point, in particular below the processing point.

The machine learning algorithm can have been trained to extract information from the sound signals and to assign a quality status and/or correction parameters, so that an estimated cutting quality and/or correction parameters can be provided as a result. Furthermore, the control signals can optionally be generated in such a way that the quality status can be maximised in response to the detected sound signals.

The quality status can be multidimensional. The quality status can include several quality features, in particular the formation of grooves and/or the formation of burrs. Alternatively or additionally, the quality status can include a slag residue and/or a cut edge roughness.

Alternatively or cumulatively, the machine learning algorithm can have been trained in order to estimate not only the cutting quality but also the at least one cutting parameter that is not set optimally.

In a further aspect, the invention relates to a digital processing unit for carrying out the method described above, with:

a read-in interface for reading in detected sound signals from the at least one airborne sound sensor during the laser cutting of a workpiece;

wherein the digital processing unit and in particular a computing unit thereof is designed to apply a machine learning algorithm to the detected sound signals in order to evaluate them. The evaluation can provide a quality estimation result. The quality estimation result can be used to generate control signals;

an output interface for outputting the quality estimation result and/or the control signals.

The cutting parameters can be selected from the group consisting of laser power, gas pressure, focus position, focus diameter, BPP and other parameters. The laser power is typically in a range between 0 and approx. 50 kWatt. Greater laser powers are also possible. The gas pressure is in a range between 1 and 25 bar during fusion cutting and around 0.5 bar during flame cutting. The focus position can be in a range of −100 and +200 mm and the focus diameter is usually in a range between 100 and 600 micrometres. The BPP can be in a range between 1 to 5 mm*mrad and the nozzle distance can be 0.1 mm to several millimetres, for example.

In a further aspect, the invention relates to a laser cutting system with a laser cutting machine, as described above, for cutting workpieces, with a network for data exchange with the digital processing unit as described above the digital processing unit.

In a further aspect, the invention relates to a computer program, wherein the computer program can be loaded into a memory unit of a computer and contains program code sections in order to cause the computer to execute the method for determining path deviations for controlling a laser cutting machine according to any one of the preceding method claims when the computer program is run on the computer.

In a further aspect, the invention relates to a computer program product which comprises a computer program, wherein the computer program is loadable into a memory unit of a computing unit and contains program code sections in order to cause the computing unit to carry out the method described above with its variants for a laser cutting machine to carry out an aspect of the invention when the computer program is executed in the computing unit.

In a further aspect, the invention relates to a computer-readable medium on which program code sections of a computer program are stored or saved, wherein the program code sections are loadable and/or executable in a processing unit in order to cause the processing unit to carry out the method as described above for the laser cutting machine according to an aspect of the invention when the program code sections are executed in the processing unit.

BRIEF DESCRIPTION OF THE FIGURES

In the following detailed description of the figures, non-limiting exemplary embodiments with the features and further advantages thereof will be discussed with reference to the drawings. In the figures.

DESCRIPTION OF ADVANTAGEOUS EMBODIMENTS IN CONNECTION WITH THE FIGURES

The invention relates to a computer-implemented method for calculating a quality estimation result of a cutting process of a laser cutting machine L based on sound signals from airborne sound sensors, wherein the corresponding airborne sound sensors are arranged below a processing point and in particular below a storage device such as a cutting table. The laser cutting machine L is typically operated with a power of more than 1 KW. It can be used in particular for cutting metal sheets and pipes.

In a preferred embodiment of the invention, the method can implement an intelligent estimation algorithm for estimating a quality index, in particular by means of a machine learning algorithm ML, which evaluates the detected airborne sound signals with regard to quality.

Figure 1:
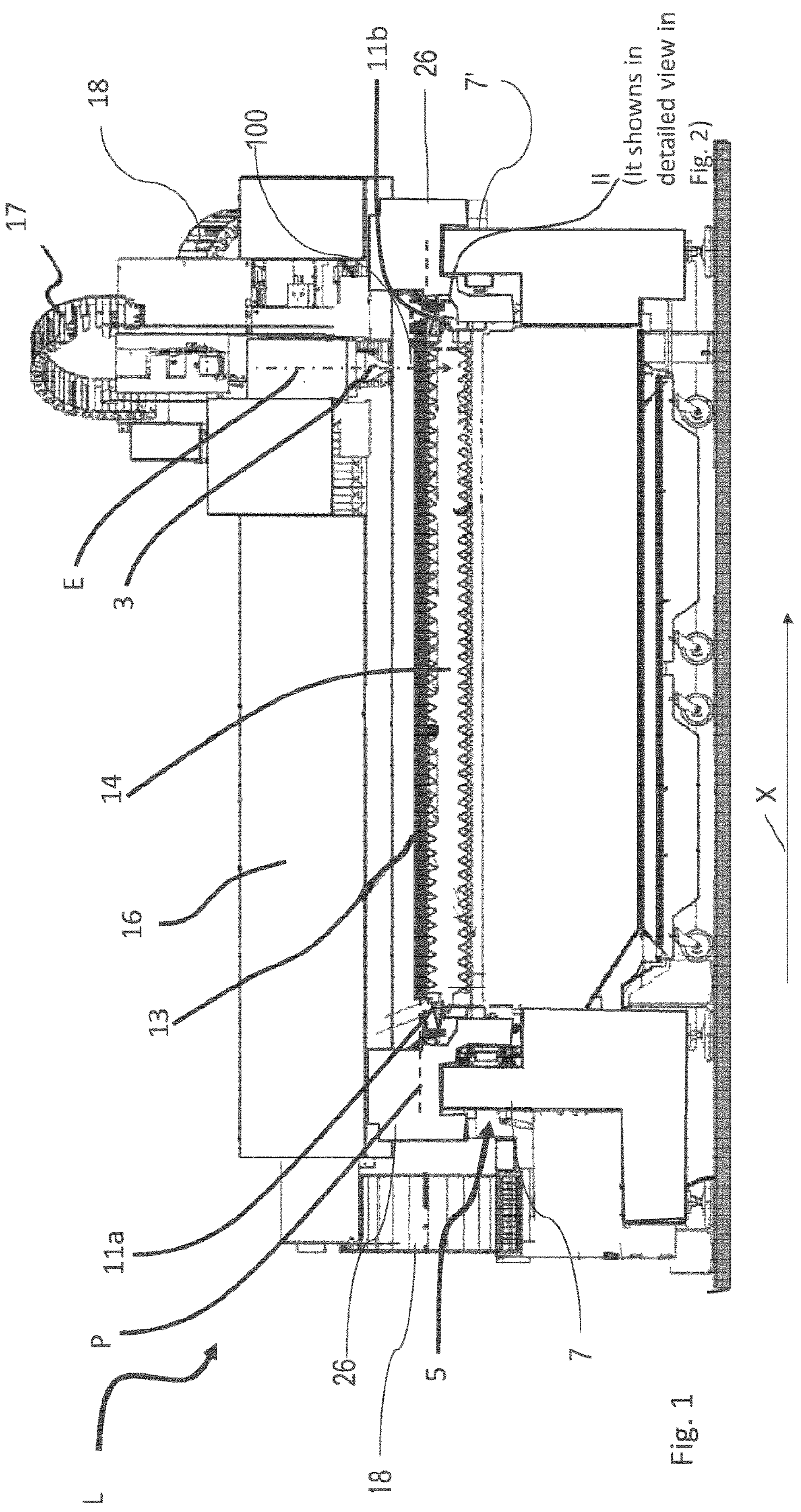
FIG. 1 shows a schematic side view of a laser cutting machine which is designed as a flat-bed cutting machine according to a preferred embodiment of the invention.

FIG. 1 shows a laser cutting machine L for cutting workpieces 13, which are arranged on a storage device 14, such as a shuttle table. A laser cutting head 3 is arranged on a movable bridge 16. The bridge 16 can be moved, in particular displaced, in an X-direction (with back and forth movement along an X-axis) relative to the workpiece 13. The bridge 16 has two bridge feet 26 which are each mounted laterally. Also shown in FIG. 1 are cable guides designated by reference numerals 17 and 18. A cable guide 17 runs in the Y-direction and a cable guide 18 runs in the X-direction (better shown in FIG. 5). At least one airborne sound sensor 11*a, b* is arranged on both sides of the shuttle table 14, i.e. at least one airborne sound sensor 11 per side, preferably more airborne sound sensors are provided. The airborne sound sensors are arranged below a support plane P. The support plane P is a plane that runs essentially parallel to the plane of the workpiece 13 (in the case of flat workpieces) and on or above which the workpiece 13 is supported at least for the purpose of cutting. The laser cutting machine L has a machine frame 5 with at least one frame part 7, 7'. A catching device for catching the cut parts can be provided below the storage device and in particular the shuttle table 14. The support plane P can be defined by upper support elements (e.g. grating tips) of the shuttle table 14. The laser cutting head 3 is used to emit a laser beam, which defines a beam propagation direction E, starting from the laser cutting head in the direction of the workpiece 13. In the case of flat workpieces that are stored essentially horizontally, the beam propagation direction E corresponds to an essentially vertical downwards path (onto the workpiece) from above (laser cutting head). An area which is shown and described in more detail below in FIG. 2 is identified by the reference symbol II.

Figure 2:
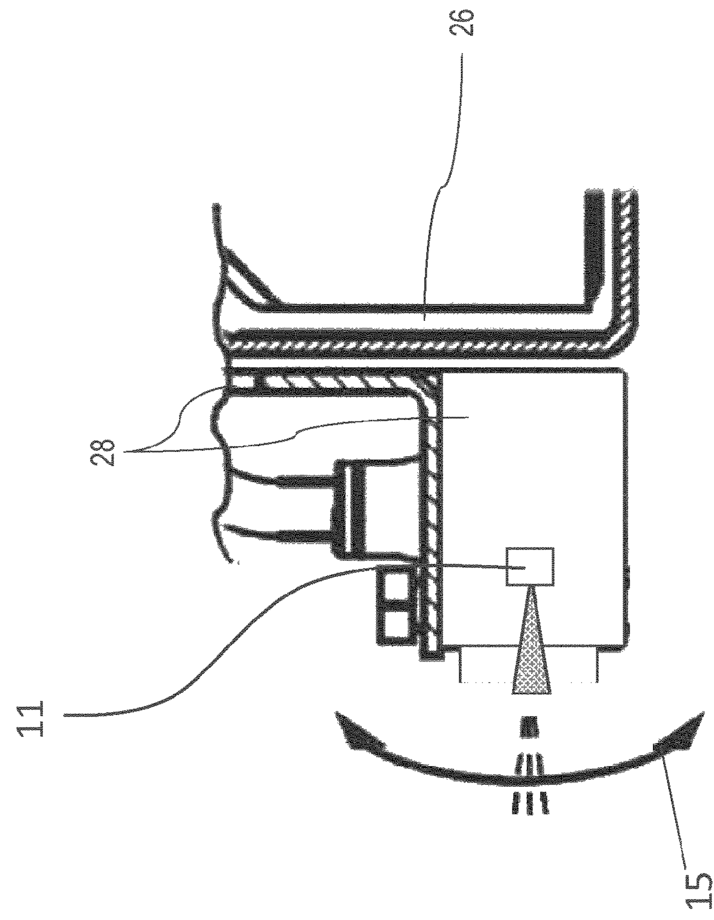
FIG. 2 shows a detailed view of an airborne sound sensor from the laser cutting machine shown in FIG. 1.

FIG. 2 is a detailed illustration of FIG. 1 and shows in detail the arrangement of one of the airborne sound sensors 11 in the beam propagation direction E after or below a processing point 100, wherein the airborne sound sensors 11 can be designed as microphones, in particular directional microphones. As can be seen, the respective airborne sound sensor 11 is arranged and/or attached to a holder 28 of the respective bridge foot 26. The airborne sound sensors 11 are thus arranged in a region—seen in the beam propagation direction E—below the workpiece or after the process point and are used to detect the airborne sound from below, so to speak. The airborne sound sensors 11 are movably arranged and/or can in particular be moved synchronously with the movement of the laser cutting head 3.

As shown in FIG. 2, the respective airborne sound sensor 11 can be pivoted. The pivoting can be performed automatically, via a motor, or manually.

The pivot axis about which the airborne sound sensor can be pivoted preferably runs parallel to the X-axis/direction, i.e. the direction in which the bridge 16 can be moved. This pivotability of the airborne sound sensor 11 is identified by reference number 15 in FIG. 2. The respective airborne sound sensor 11 can thus be pivoted up or down in a specific angular range, i.e. in a plane defined by the Z and Y-directions. This angular range can be preconfigured and/or in a range of 0° (horizontal)-90° (vertical), in particular 0°-+20°. The aforementioned angular range can be determined cumulatively or alternatively depending on the position of the processing point in the X-Y plane spanned by the X and Y-directions according to the cutting plan and automatically track the respective position in the X-Y plane.

Alternatively or cumulatively, the pivot axis about which the airborne sound sensor 11 can be pivoted can also be oriented parallel to the Z-axis, which in particular runs essentially vertically. The respective airborne sound sensor 11 can thus be pivoted forwards or backwards (in relation to the direction of movement of the bridge 16) in a specific angular range. The same or a different angle range can be preconfigured here as the angle range in relation to the X-axis. The Z-axis angular range can be determined as a function of the size of the workpiece 13 and/or as a function of the size of the parts to be cut according to the cutting plan. The Z-axis angle range can cover a spectrum between −90° and +90°. Pivoting around the Z-axis has the advantage that the airborne sound sensor can be moved proactively and with an additional means with the movement of the cutting head 3 and can thus provide a fine adjustment of the detection position, while the rough adjustment is carried out by moving the holder 28 or the bridge foot 26 takes place.

Figure 3:
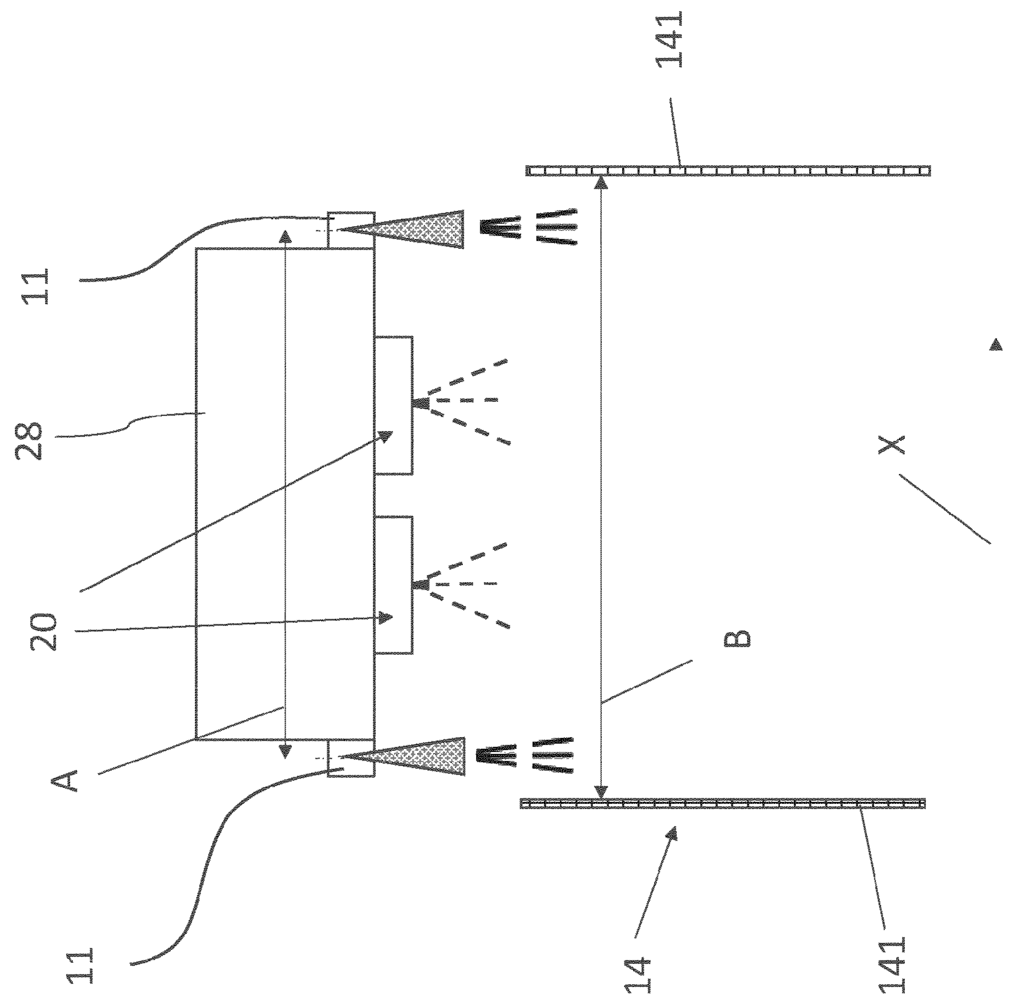
FIG. 3 shows a plan view of a detail of a laser cutting system, which in this embodiment of the invention has two airborne acoustic sensors combined with two cleaning nozzles.

FIG. 3 again shows a part of the laser cutting system with two grid elements 141 of the storage device 14. The respective grid elements 141 are at a distance B from one another in the X-direction. As shown in FIG. 3, two airborne sound sensors 11 can be arranged on the holder 28 in such a way that they are each arranged between two grid elements 141. The two airborne sound sensors 11 are at a distance A from one another. The distance A is preferably selected to be smaller than the distance B (in each case based on the X-axis). This makes it possible for the area between two grid elements 141, which extend in a Y-axis, to be detected by two airborne sound sensors 11. Alternatively, more than two airborne sound sensors 11 can also be provided between two grid elements 141 in each case. The direction X in which the bridge 16 can be moved is identified by the reference character X.

Alternatively or cumulatively, the airborne sound sensors 11 can be combined with at least one fluid nozzle 20, in particular a cleaning nozzle 20. The same number of cleaning nozzles 20 and airborne sound sensors 11 is preferably provided.

The fluid nozzles 20, like the airborne sound sensors 11, can be arranged and/or fastened to the holder 28.

In a preferred embodiment of the invention, an evaluation device AWE (shown in FIG. 6) is provided for evaluating the detected sensor signals (in particular the airborne sound sensor signals). The evaluation device AWE can be intended to remove the sound emissions from the at least one fluid nozzle 20 from the detected airborne sound sensor signals of the airborne sound sensors 11. The quality of the quality estimation result can thus be improved.

Figure 4:
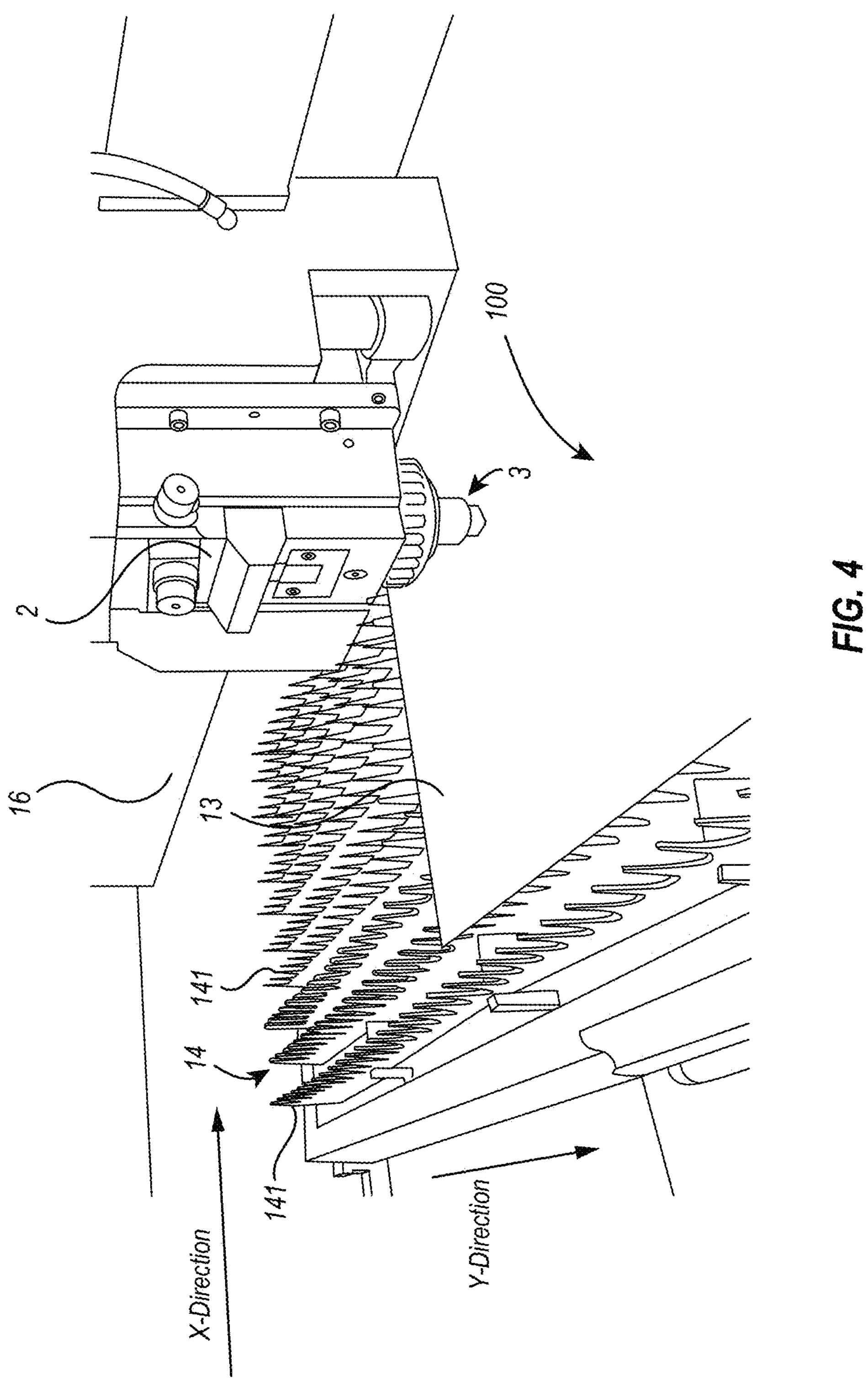
FIG. 4 shows a photographic representation of a possible architecture in which the laser cutting head is traversable on a bridge that is also traversable.

FIG. 4 shows a photographic representation of a laser cutting system according to an exemplary embodiment, for example based on the preceding figures, with a movable carriage 2 on which the laser cutting head 3 is arranged. A movable carriage 2 can be moved laterally on the bridge 16 in the Y-direction in order to machine the workpiece 13 which is on the storage device 14, in particular the cutting grid 14. The laser cutting head 3 is used to process the workpiece 13 at the processing point 100.

So that there is always at least one microphone or another airborne sound sensor in the vicinity of what is happening in the process, airborne sound sensors (and in particular microphones) 11 are preferably used on both sides of the shuttle table 14. Thus, regardless of the location of the cutting (particularly in the Y-direction), the summative sound intensity from the microphones 11 located on both sides is always of a similar magnitude.

FIG. 4 shows the cutting table or changing table 14 with the individual (cutting) grid elements 141 from diagonally above. In certain cases, cutting may be exactly on (or along) a cutting grid element 141. In this case, the detection of the sound by the cutting grid element can be impeded if the microphone 11 is seated exactly on the front side of the cutting grid element 141. It is therefore proposed to use at least two microphones 11 per side (as shown in FIG. 3), wherein the two microphones 11 are slightly offset in the X-direction (see FIG. 4 for the coordinate system), in particular at a distance A, which is smaller than the distance B between two adjacent cutting grid elements 141.

The detected sound signals can be evaluated for process monitoring using the same class of algorithms as the optical signals. In particular, end-to-end algorithms can be used for signal processing and evaluation. The sound signals can be fed to the cutting quality monitoring individually or together with optical signals, wherein neural networks, in particular deep neural networks, are particularly suitable for this.

If sound signals are trained together with known cutting qualities, the neural network learns which sound information has to be taken into account in order to be able to estimate the cutting quality. Known noises from other sound sources that do not contain any information about the cutting quality (such as the noises of the cleaning nozzles) can be filtered out of the sound signals detected by the microphone or microphones using suitable noise filters. For this purpose, individual noise profiles of these other noise sources can be detected.

Figure 5:
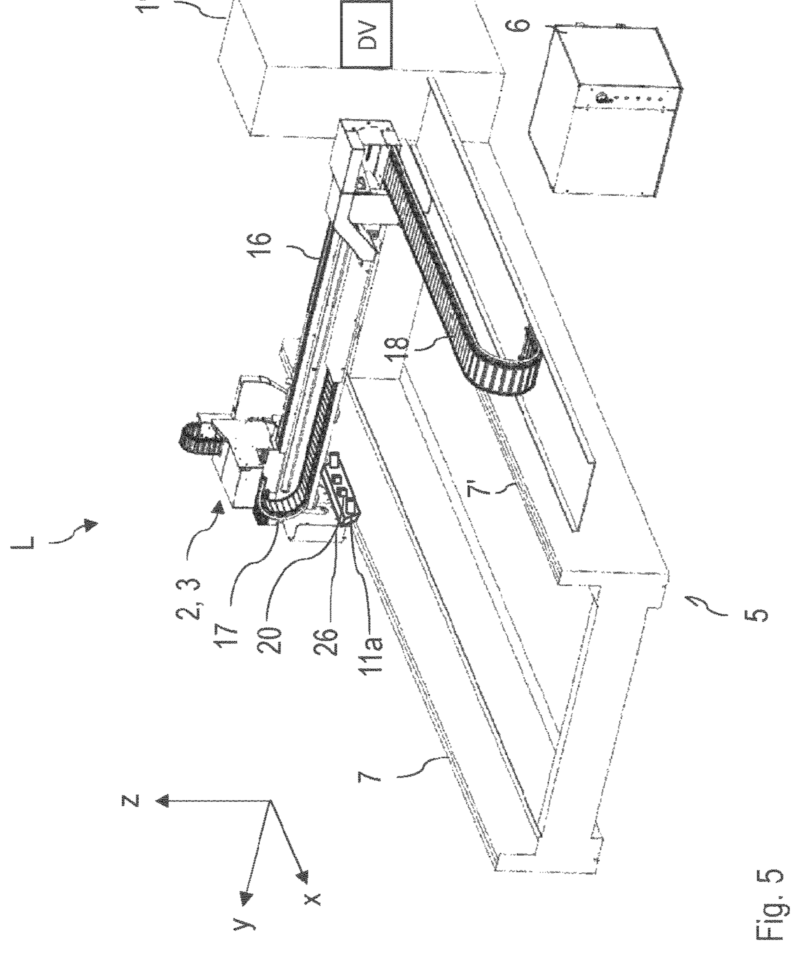
FIG. 5 shows a schematic representation of a laser cutting machine with a digital data processing unit for carrying out a method for providing a quality estimation result according to an exemplary embodiment.

FIG. 5 shows a perspective view of the laser cutting system with the laser cutting machine L and a digital processing unit DV, which can be arranged in a control cabinet 19, and the airborne sound sensors 11*a*. The laser is supplied with energy by a laser light source 6 in order to cut the workpiece 13. The laser cutting head 3 arranged on a movable carriage 2 is moved via a chain drive, in particular a rotating chain drive. The Y-cable guide is marked with reference numeral 17. Reference numeral 18 designates the X-cable guide to move the bridge 16 in the longitudinal direction relative to the workpiece 13 and/or relative to the storage device 14. In the embodiment shown in FIG. 5, in addition to the airborne sound sensors 11, cleaning nozzles 20 are also formed, which can each be arranged on the bridge feet 26. The machine frame 5 includes frame parts 7,7' as a support for the frame.

Figure 6:
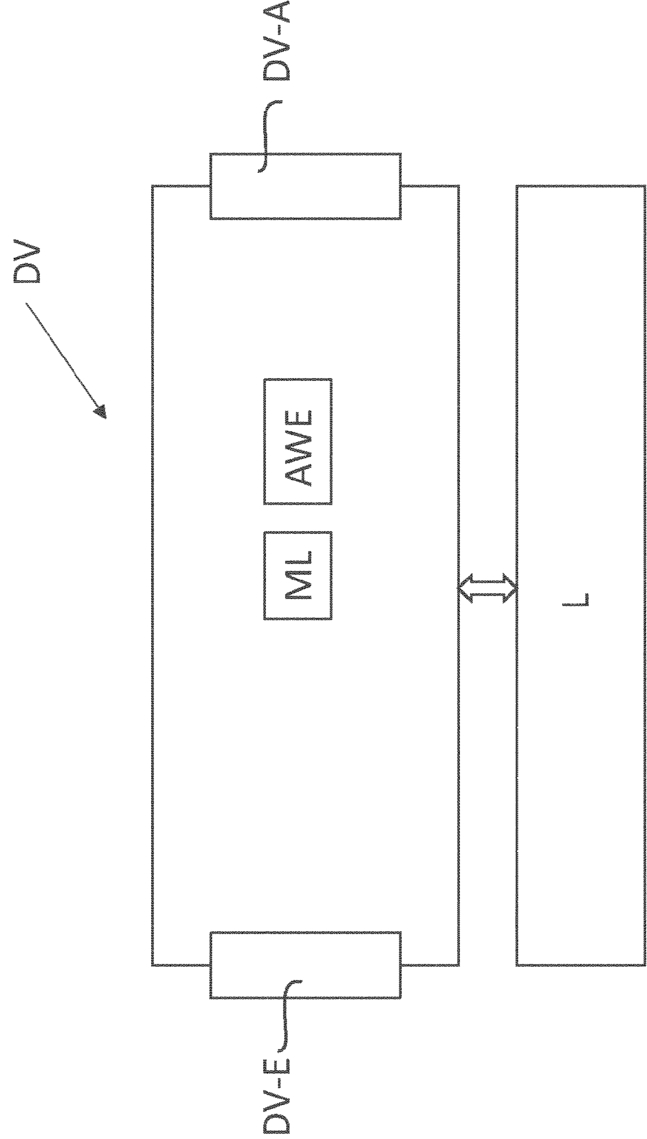
FIG. 6 shows a schematic representation of the digital processing unit for providing a quality estimation result.

FIG. 6 shows a schematic representation of the digital processing unit DV with a read-in interface DV-E and an output interface DV-A. The output interface DV-A is used to output the quality estimation result. The digital processing unit DV can include a computing unit on which the machine learning algorithm ML is implemented. Furthermore, an evaluation device AWE can be embodied on the digital processing unit DV. The evaluation device can be implemented on the computing unit. The digital processing unit DV exchanges data with the laser cutting machine L, in particular in order to detect and process the detected sensor signals (airborne sound sensor signals and/or optical signals).

Figure 7:
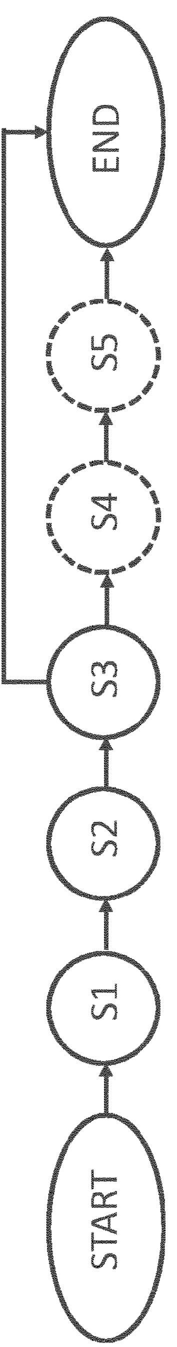
FIG. 7 shows a flow chart of a method for providing a quality estimation result in different variant embodiments.

FIG. 7 shows a flow chart for a method for providing a quality estimation result for a laser cutting process of a laser cutting machine L in different variant embodiments.

After the start of the method, in step S1, sound signals are detected or recorded by at least one airborne sound sensor 11 during the laser processing of the workpiece 13 (also referred to as step a)). The at least one airborne sound sensor 11 is arranged after and in particular below the processing point 100 in the beam propagation direction E and oriented towards the processing point 100. The processing point 100 (shown in FIG. 1 and FIG. 4) is on the workpiece or within the workpiece 13 on the axis of the laser beam propagation direction E.

In a first embodiment of the invention, the method can end at this point. Alternatively, it can continue with step b as follows:

Optionally, in step S2 (also referred to as step b)), the detected sound signals (airborne sound) can be read-in in the digital processing unit DV in order to be processed there. In particular, information about the cutting process is extracted from the detected sound signals.

In step S3, the read-in, detected sound signals can (optionally) be evaluated in the digital processing unit DV (step c). The evaluation is carried out using a machine learning algorithm ML, which is implemented on the digital processing unit DV and is intended to estimate a cutting quality on the basis of the evaluated, read-in, detected sound signals and to provide an estimated cutting quality as a result.

In a first variant embodiment, which is shown in FIG. 7 with solid lines, the method can end after step S3. Additional steps can be carried out cumulatively in further variant embodiments, which are shown in FIG. 7 with dashed lines.

For example, it can be checked (step d) whether the estimated cutting quality provided as a result falls below or exceeds a threshold. The threshold may be preconfigured to provide a sufficient level of error tolerance and/or quality specifications. The result of this check can be output on a user interface.

Furthermore, depending on the result of the check in step S4, the generation of control signals for controlling or regulating the laser processing machine L can be triggered (step e).

Optionally, the control signals generated in step S5 can be automatically applied or executed cumulatively on a control unit of the laser processing machine L (step f). Thereafter, the method can be terminated or executed repeatedly. In the case of step S5, the machine learning algorithm is intended to provide the parameters to be corrected, preferably with the respective correction values (e.g. "reduce feed to value X" or "increase laser power to value Y"), in addition to the estimation result for the quality. These are then used to calculate the control signals.

Finally, it should be noted that the description of the invention and the exemplary embodiments are not to be understood as limiting in terms of a particular physical realisation of the invention. All of the features explained and shown in connection with individual embodiments of the invention can be provided in different combinations in the subject matter according to the invention to simultaneously realise the advantageous effects thereof. In particular, the features, subclaims and/or alternative embodiments of the invention that have been claimed or described in connection with the laser processing machine, for example, can also be transferred to the method, and vice versa.

The scope of protection of the present invention is given by the following claims and is not limited by the features illustrated in the description or shown in the figures.

It is particularly obvious to a person skilled in the art that the invention can be used not only for flat workpieces, but also for pipes. Furthermore, the components of the digital processing unit can be realised in a distributed manner on a number of physical products.

LIST OF REFERENCE NUMERALS

2 movable carriage
3 laser cutting head
5 machine frame
6 laser light source
7, 7' frame part
11, 11*a*, 11*b* airborne sound sensors, in particular microphones
13 workpiece
14 storage device, in particular a shuttle table or mandrel
141 grid element
16 bridge
17 Y-cable routing (running in the Y-direction)
18 X-cable routing (running in the X-direction)
19 control cabinet
20 fluid nozzle, in particular cleaning nozzle
26 bridge foot
28 holder
A distance between two airborne sound sensors
B distance between two grid elements of the shuttle table
AWE evaluation device
100 processing point
DV digital processing unit
DV-E read-in interface
DV-A output interface
E (laser) beam propagation direction
L laser cutting machine
ML machine learning algorithm
P support plane
S1 detecting sound signals
S2 reading in the detected sound signals on a digital processing unit
S3 evaluating the sound signals
S4 generating control signals
S5 using the control signals to control the laser cutting machine L

The invention claimed is:

1. A laser cutting machine for cutting workpieces at a processing point, the laser cutting machine comprising:

a laser cutting head, which is mounted so to be movable at least in an X-direction and defines a beam propagation direction of a laser beam;

a storage device for storing the workpiece to be cut;

a machine frame with at least one frame part;

at least one airborne sound sensor, which is configured to be moved in the X-direction relative to the at least one frame part, wherein the at least one airborne sound sensor is arranged in the beam propagation direction after or below the processing point and oriented towards the processing point, and a bridge with two bridge feet arranged laterally thereon for guiding the bridge on the machine frame in the X-direction perpendicular to a Y-direction, wherein the at least one airborne sound sensor is arranged at least indirectly on a bridge foot.

2. The laser cutting machine according to claim 1, wherein at least two airborne sound sensors, or four airborne sound sensors, are arranged in the beam propagation direction below the processing point and oriented towards the processing point.

3. The laser cutting machine according to claim 1, wherein the at least one airborne sound sensor serves to detect airborne sound in a frequency range between 10 Hz and 2 MHz, or in a range between 150 kHz and 700 kHz.

4. The laser cutting machine according to claim 3, wherein the at least one airborne sound sensor is arranged on each of the two bridge feet.

5. The laser cutting machine according to claim 1, wherein at least two airborne sound sensors are arranged on one bridge foot in each case, on a holder on the bridge foot in each case, and are at a distance from one another in the X-direction.

6. The laser cutting machine according to claim 5, wherein the at least two airborne sound sensors are at a sensor distance from one another in relation to the X-direction which is smaller than a distance between two grid elements of the storage device for the workpiece to be processed.

7. The laser cutting machine according to claim 1, wherein at least one fluid nozzle for generating a fluid curtain is arranged in front of the one or more airborne sound sensors in a direction of sound detection.

8. The laser cutting machine according to claim 7, wherein an evaluation device is provided for sensor signals of the at least one airborne sound sensor, wherein the sensor signals in the evaluation device are corrected for sound emissions of the at least one fluid nozzle.

9. The laser cutting machine according to claim 1, wherein the laser cutting machine includes optical sensors in order to detect optical signals from a process zone of the laser processing of the workpiece.

10. The laser cutting machine according to claim 1, wherein the laser cutting machine comprises a control unit.

11. A laser cutting system for monitoring and/or controlling a laser cutting machine, the laser cutting system comprising:

a laser cutting machine as claimed in claim 1, which is configured to cut workpieces;

a digital processing unit comprising:

a read-in interface for reading in detected airborne sound signals from the at least one airborne sound sensor during the laser cutting of a workpiece, a computing unit, which is configured to apply a machine learning algorithm to the detected sound signals in order to evaluate said detected sound signals and provide an estimated cutting quality as a result, an output interface for outputting the result; and a network for data exchange with the digital processing unit.

* * * * *